(12) United States Patent
Kristiansen (10) Patent No.: US 9,444,555 B2
(45) Date of Patent: Sep. 13, 2016

(54) SUBSEA COMMUNICATION

(75) Inventor: Karstein Kristiansen, Trondheim (NO)

(73) Assignee: Siemens Aktiengesellschaft, München (DE)

( * ) Notice: Subject to any disclaimer, the term of this patent is extended or adjusted under 35 U.S.C. 154(b) by 140 days.

(21) Appl. No.: 14/234,077

(22) PCT Filed: Jul. 11, 2012

(86) PCT No.: PCT/EP2012/063545
§ 371 (c)(1),
(2), (4) Date: Jan. 21, 2014

(87) PCT Pub. No.: WO2013/013976
PCT Pub. Date: Jan. 31, 2013

(65) Prior Publication Data
US 2014/0191878 A1    Jul. 10, 2014

(30) Foreign Application Priority Data
Jul. 22, 2011  (EP) ..................... 11175072

(51) Int. Cl.
H04B 13/02    (2006.01)
E21B 23/04    (2006.01)

(52) U.S. Cl.
CPC .............. *H04B 13/02* (2013.01); *E21B 23/04* (2013.01)

(58) Field of Classification Search
None
See application file for complete search history.

(56) References Cited

U.S. PATENT DOCUMENTS

| | | | |
|---|---|---|---|
| 6,420,976 B1* | 7/2002 | Baggs et al. ............... | 340/853.3 |
| 7,921,919 B2 | 4/2011 | Horton, III | |
| 2010/0220773 A1* | 9/2010 | Carter et al. ................. | 375/222 |

FOREIGN PATENT DOCUMENTS

| | | |
|---|---|---|
| CN | 101680270 A | 3/2010 |
| CN | 101823550 A | 9/2010 |
| GB | 2264424 A | 8/1993 |
| GB | 2332220 A | 6/1999 |
| WO | WO02098013 A1 | 12/2002 |

OTHER PUBLICATIONS

PCT International Search Report and Written Opinion of the International Searching Authority dated Sep. 26, 2012 for corresponding PCT/EP2012/063545.
Chinese Office Action for Chinese Patent Application No. 201280036313.1, mailed Oct. 8, 2015, with English Translation.

* cited by examiner

*Primary Examiner* — Fekadeselassie Girma
*Assistant Examiner* — Thomas McCormack
(74) *Attorney, Agent, or Firm* — Lempia Summerfield Katz LLC (57) ABSTRACT

A subsea communication system and its method of operating are provided. A subsea power distribution module of the subsea communication system may be adapted to be connected to a topside power supply of a topside installation and to distribute electric power received from topside power supply to subsea modules. A first communication connection to the subsea power distribution module may be adapted to provide a data communication with the topside installation. A second communication connection between the subsea power distribution module and a subsea module may be provided. The subsea power distribution module may forward data communications received on the first communication connection to the subsea module via the second communication connection.

14 Claims, 4 Drawing Sheets

FIG 2

SUBSEA COMMUNICATION

CROSS-REFERENCE TO RELATED APPLICATIONS

The present patent document is a §371 nationalization of PCT Application Serial Number PCT/EP2012/063545, filed Jul. 11, 2012, designating the United States, which is hereby incorporated by reference, and this patent document also claims the benefit of EP 11175072.5, filed on Jul. 22, 2011, which is also hereby incorporated by reference.

TECHNICAL FIELD

The present embodiments relate to the technical field of a subsea communication system that comprises a subsea power distribution module, and to a method of operating a subsea communication system.

BACKGROUND

Oil platforms are often used in offshore oil and gas production. In the operation of offshore oil platforms, it may be necessary to install electronic equipment under water (e.g., for controlling functions of a subsea Christmas tree or a subsea blowout preventer). More recently, subsea processing facilities have been established in which processing equipment, such as electrically driven pumps and gas compressors, are relocated to the ocean floor. Subsea processing facilities may be provided with a power grid as well as control, monitoring, and communication systems.

In both of these examples, a subsea installation is provided at the ocean floor. The subsea installation comprises electronic equipment that may be monitored and/or controlled from a topside installation, which may comprise a topside control system and which may be based on a marine vessel (e.g., a ship or a platform), or may be based onshore. The subsea installation may, for example, comprise a Well Control Module (WCM) or a Manifold Control Module (MCM) that may receive commands from the topside installation or that may transmit information to the topside installation.

In a conventional system, the communication between the topside control system and such module of the subsea installation is generally based on the AFSK (Audio Frequency Shift Keying) modem standard, such as Bell 202. By using a Bell 202 modem at the topside control system and another Bell 202 modem at the subsea installation that is connected to the respective subsea module, a data transfer rate of about 1200 Baud at half duplex may be achieved. If several Bell 202 subsea modems are connected to the topside modem, a data transfer rate of 1200 Baud divided by the number of subsea modems may be achieved for each subsea modem. The data transfer is thus rather slow and may not easily be upgraded.

There is an increased demand for monitoring and controlling subsea installations, which requires higher bandwidth for transferring the data of sensors and/or control signals between the subsea and the topside installations. Updating the existing infrastructure (e.g., modems of the subsea control modules and data lines in the umbilical), may be a cost intensive process.

SUMMARY AND DESCRIPTION

Accordingly, there is a need for an improved subsea communication system that enables data communication with a higher bandwidth and that may be implemented cost efficiently. An embodiment provides a subsea communication system that comprises a subsea power distribution module adapted to be connected to a topside power supply of a topside installation and to distribute electric power received from the topside power supply to subsea modules. The subsea communication system further comprises a first communication connection to the subsea power distribution module adapted to provide a data communication with the topside installation and a second communication connection between the subsea power distribution module and the subsea module. The subsea power distribution module is configured to forward data communications received on the first communication connection to the subsea module via the second communication connection. It is further configured to supply electric power to the subsea module for operating the subsea module.

A second communication path that runs via the subsea power distribution module may thus be provided. An existing communication path may be maintained. Accordingly, when upgrading a subsea installation that comprises such subsea power distribution module and a number of subsea modules, an upgraded subsea module may be connected to the subsea power distribution module for communication and power supply purposes, leaving the remaining communication infrastructure unaffected. It thus becomes possible to upgrade a subsea installation over a time frame of several years, as individual modules may be upgraded to faster communication technologies, the new communication path enabling a co-existence of the old and the new communication system.

In an embodiment, the subsea power distribution module and the subsea module may be connected by a cable, the cable providing the second communication connection and further providing a power supply connection between the subsea power distribution module and the subsea module, using which the subsea power distribution module supplies the electrical power to the subsea module. A single cable connection may thus be sufficient to supply the subsea module with electric power and a connection for data communication.

The second communication connection and the power supply connection may be provided on different physical lines in the cable. In other embodiments, the same physical line may be used for data communication and power transmission (e.g., by using power line communication schemes or the like). In other embodiments, two separate cables may be provided between the subsea power distribution module and the subsea module.

The subsea communication system may comprise two or more of the second communication connections, with each second communication connection connecting the subsea power distribution module to a subsea module. Two or more subsea modules may, for example, be connected in a star topology via the second communication connections to the subsea power distribution module. The subsea power distribution module may be configured to distribute data communications received on the first communication connection to the subsea modules via the respective second communication connection. The subsea installation may thus be upgraded with new subsea modules making use of the new communication path for data communication.

The subsea power distribution module may, for example, comprise a switch, an access multiplier, or a hub for distributing the data communications received on the first communication connection to the two or more subsea modules via the two or more second communication connections. The subsea power distribution module may be configured to distribute data communications in accordance with a broadcast scheme, such as a multi drop scheme, or to forward data communications to individual modules (e.g., corresponding to a point-to-point communication scheme).

In an embodiment, the subsea communication system comprises a subsea modem of a first type ranged in the subsea module, the subsea communication system being configured to enable the subsea modem of the first type to perform a data communication with a topside modem of the first type at the topside installation via the subsea power distribution module and the first and second communication connections. The modem of the first type may, for example, be a high speed modem. Each subsea module connected to the subsea power distribution module via a second communication connection may comprise such subsea modem of the first type. The fact that both topside and subsea modems are of the first type does not imply that they have to be identical or the same model, it simply means that the modems use compatible communication schemes that enable a data communication between the topside and subsea modems of the first type.

Note that other configurations are also conceivable, such as providing the subsea modem of the first type in the subsea power distribution module and providing a different type of communication connection (e.g., a network connection), between the subsea power distribution module and the subsea module.

In an embodiment, the subsea communication system further comprises a subsea signal distribution module providing a topside communication connection to the topside installation, wherein the first communication connection is a connection between the subsea signal distribution module and the subsea power distribution module. The topside communication connection may, for example, be provided by a physical communication line of an umbilical that connects the subsea signal distribution module to the topside installation. The subsea communication system may comprise a subsea modem of a first type, the subsea modem of the first type being arranged in the subsea module, the subsea power distribution module, or the subsea signal distribution module. The subsea signal distribution module may be configured to forward data communications received from a topside modem of the first type to the subsea modem of the first type and to distribute data communications received from a topside modem of a second type to one or more subsea modems of the second type that are arranged in respective subsea modules and are connected to the subsea signal distribution module. The topside and subsea modem of the first type may be adapted to perform a data communication at a higher data transfer rate than the topside and subsea modems of the second type. The modems of the first type may be termed high frequency (or high speed) modems, whereas the modems of the second type may be termed low frequency (or low speed) modems.

In such configuration, two independent subsea communication distribution paths may be established by a single physical communication line in an umbilical connecting the subsea signal distribution module to the topside installation. The subsea signal distribution module may distribute communications to the correct recipient, and may transmit messages from modems of both types on the same physical communication line to the topside installation. The subsea signal distribution module may have direct communication connections to the subsea modules each comprising subsea modem of the second type. It may distribute data communications received from the topside modem of the second type to these connected subsea modules. Messages from the topside modem of the first type may be forwarded to the subsea power distribution module, which may perform the distribution of data communications to subsea modules via the second communication connections, as mentioned above. Again, it should be noted that the subsea signal distribution module may comprise the subsea modem of the first type, and that other types of communication (such as network communication), may be used to forward the data communications to the subsea modules via the first communication connection, the subsea power distribution module, and the second communication connections. The particular implementation may be chosen in accordance with the application that may, for example, depend on the distances between the different modules and expected interference.

The subsea modem of the first type may be adapted to perform the data communication with the topside modem of the first type using an orthogonal frequency division multiplexing (OFDM) scheme.

The topside and the subsea modems of the first type may, for example, be adapted to use a frequency band lying within a range of about 50 kHz to about 10 MHz for the communication, the frequency band being divided into frequency multiplexed channels, with each channel having a predetermined frequency bandwidth. The bandwidth for each channel may for example be about 3 to 5 kHz. A total of 100 to 300 channels may be provided. Using such scheme has the advantage that if a particular channel becomes affected by interference or the like, the other channels may still be used for data transmission, thus keeping the transmission rate up. Data transmission rates above 0.5 Mbps (megabits per second) or even above 1 Mbps may thus be achieved using the topside and subsea modems of the first type.

The topside and subsea modems of the second type may be configured to communicate using an Audio Frequency Shift Keying (AFSK) communication scheme. The topside and the subsea modems of the second type may for example be Bell 202 compatible modems. The subsea modems of the second type may connect to the subsea signal distribution module in a star topology. The topside and subsea modems of the second type may be adapted to communicate using a multi drop communication scheme.

In an embodiment, the subsea and topside modems of the first type are communicating in a first frequency band that is higher than a second frequency band in which the topside and subsea modems of the second type are communicating. The subsea signal distribution module may comprise a frequency multiplexer, in particular a frequency diplexer, that is adapted to combine and/or split the first and second frequency bands so as to enable a data communication of the topside modem of the first type with the subsea modem of the first type in the first frequency band and of the topside modem of the second type with the subsea modem of the second type in the second frequency band on a single communication line connecting the subsea signal distribution module to the topside installation.

By making use of different frequency bands, the implementation of the new communication system into an existing subsea installation does not disturb the communication between the modems of the second type. Further, high data transfer rates may be achieved by the modems of the first type by making use of a higher frequency band, in particular in combination with the above mentioned OFDM communication scheme. By using the different frequency bands, the same physical communication line may be used by both types of modems, so that the existing umbilical may be used by both an existing communication system and the upgraded communication system, thereby reducing the cost for upgrading. At the topside installation, a similar frequency multiplexer, in particular a frequency diplexer, may be provided for distributing data communications received in the different frequency bands to the appropriate type of topside modem and for combining data communications received from the different types of topside modems for their transmission on a single communication line of the umbilical in the different frequency bands. As an example, a passive diplexer may be provided in the subsea signal distribution module and at the topside installation.

Note that the data communication does not need to take place over the whole respective frequency bands, but may occur at particular frequencies lying in the respective frequency band.

In an embodiment, the first and the second frequency bands are configured such that they do not overlap. The first frequency band may, for example, lie above a threshold frequency and the second frequency band may lie below this threshold frequency. The threshold frequency may lie in a range of about 10 kHz to about 150 kHz. An interference of the communication signals in the different frequency bands may thus be avoided.

The first frequency band may, for example, be in a range of about 50 kHz to about 10 MHz. The second frequency band may, for example, be in a range of about 1 kHz to about 5 kHz. By making use of frequencies lying in the first frequency band, the modems of the first type may perform a data communication at relatively high data transfer rates.

The subsea power distribution module may be configured so as to supply each of the subsea modules with electric power. These may be the subsea modules comprising a subsea modem of the first type and being connected to the subsea power distribution module, or the subsea modules comprising a subsea modem of the second type and being connected for communication purposes to the subsea signal distribution module.

The subsea modules, the subsea power distribution module, and/or the subsea signal distribution module may be part of a subsea installation. Each of these modules may be adapted to be operated at a sea depth of more than 1000 meters, more than 2000 meters, more than 3000 meters, or between about 1000 meters and about 4000 meters.

The subsea module connected to the subsea power distribution module via the second communication connection may be a well control module (WCM), a manifold control module (MCM), or another type of subsea module to be installed subsea.

The subsea power distribution module may further comprise a transformer. A primary side of the transformer may be connected to the topside installation (e.g., via an electric power transmission line of the umbilical). The secondary side of the transformer may be connected to the subsea module (e.g., by the above mentioned power supply connection). The subsea power distribution module may comprise plural transformers, each supplying electric power to a connected subsea module. On the primary side, the plural transformers may be connected together, with the power supply line of the umbilical being terminated in the joint connection.

A further embodiment provides a method of operating a subsea communication system. The subsea communication system comprises a subsea power distribution module adapted to be connected to a topside power supply of a topside installation and to distribute electric power received from the topside power supply to the subsea modules. In the method, a data communication from the topside installation may be received at the subsea power distribution module on a first communication connection. The received data communication may be forwarded on a second communication connection from the subsea power distribution module to a subsea module. In a further act of the method, the subsea power distribution module may supply electric power to the subsea module for operating the subsea module. In certain embodiments, the second act may be continuously performed during the first acts.

The method provides similar advantages as those outlined further above with respect to the subsea communication system.

In an embodiment of the method, the forwarding of the received data communication to the subsea module and the supplying of electric power to the subsea module may be performed using the same cable that connects the subsea power distribution module to the subsea module. Accordingly, further cables may not be required for implementing a new communication path via the subsea power distribution module.

In a further embodiment, the subsea communication system further comprises a subsea signal distribution module connected via the first communication connection to the subsea power distribution module. In a further act of the method, a data communication received by the subsea signal distribution module from the topside installation may be forwarded by the subsea signal distribution module to the subsea power distribution module on the first communication connection.

The data communication that is forwarded on the first communication connection may be received from a topside modem of a first type and forwarded to a subsea modem of the first type. In the method, a data communication may be received at the subsea signal distribution module from a topside modem of a second type, and the data communication may be forwarded to a subsea modem of the second type comprised in a subsea module that is connected to the subsea signal distribution module. Two communication paths may thus be implemented by using a single physical communication line of an umbilical.

The forwarding of a data communication to the subsea modem of the first type or to the subsea modem of the second type may be performed by the subsea signal distribution module independence on the frequency band in which the data communication is received. For this purpose, the subsea signal distribution module may comprise a frequency multiplexer, in particular a diplexer, which may be adapted to perform the forwarding (e.g., by separating the two frequency bands used for communication by the different types of modems).

The method may be performed by any of the above mentioned embodiments of the subsea communication system.

The features of the embodiments mentioned above and those yet to be explained below may be combined with each other unless noted to the contrary.

The scope of the present invention is defined solely by the appended claims and is not affected to any degree by the statements within this summary. The present embodiments may obviate one or more of the drawbacks or limitations in the related art.

DETAILED DESCRIPTION

In the following, the embodiments illustrated in the accompanying drawings are described in more detail. It should be clear that the following description is only illustrative and non-restrictive. The drawings are only schematic representations, and elements in the drawings and not necessarily to scale with each other.

Figure 1:
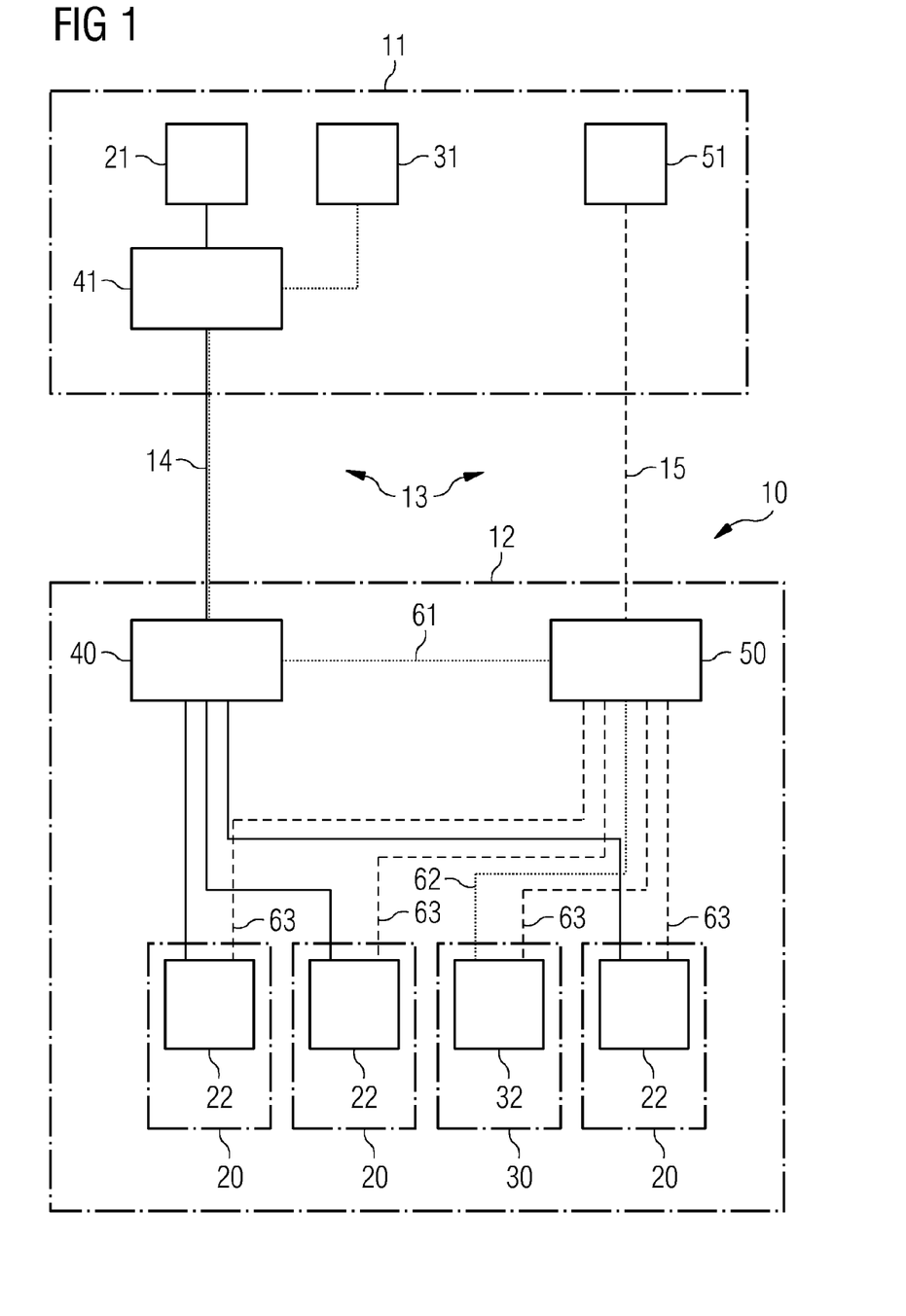
FIG. 1 is a schematic block diagram illustrating a subsea communication system according to an embodiment.

FIG. 1 illustrates a subsea communication system 10 according to an embodiment. With the subsea communication system 10, an existing subsea communication system may be upgraded.

In the example of FIG. 1, a topside installation 11 (e.g., a topside control system), is, by an umbilical 13, coupled to a subsea installation 12. The topside control system 11 may include one or more data processing systems, such as computers that receive data from the subsea installation 12 or issue control commands to the subsea installation 12. The topside control system 11 may, for example, be installed on a marine vessel, such as a drill ship or an oil platform, or the topside control system 11 may be installed at an onshore site. For performing a data communication with the subsea installation 12, the topside control system 11 comprises a topside low frequency modem 21 (modem of the second type). The topside low frequency modem 21 may, for example, operate according to the AFSK standard. Modem 21 may receive digital signals from a data processing unit and modulate an analog signal in accordance with the digital data in order to transmit the digital data. Additionally, the modem 21 may demodulate a received analogue signal and supply corresponding digital data to the data processing unit (e.g., a computer system).

Subsea installation 12 may be part of a well head assembly, a subsea production facility, or the like. The subsea installation 12 comprises subsea low frequency modems 22 (subsea modems of the second type), which are each in a subsea module 20 (e.g., a well control module (WCM) or a manifold control module (MCM)). In the example illustrated in FIG. 1, the subsea installation 12 comprises three subsea modules 20 with subsea low frequency modems 22 that are coupled to a signal distribution module 40. The topside low frequency modem 21 may communicate with one or each of the subsea low frequency modems 22 by transmitting a data communication in form of a modulated signal over a topside communication connection, here implemented as the data transmission line 14 provided by the umbilical 13. Data transmission line 14 may be a physical line, such as a copper line dedicated to the transmission of data communications, in particular the modulated signal. In other embodiments, the data transmission line 14 may be used to perform further functions in the umbilical 13.

Modems 21 and 22 are termed "low frequency" modems as they communicate with each other by using a frequency range that is lower than the frequency range used by the modems 31 and 32 for communication, which are therefore termed high frequency modems (modems of the first type). Modems 21 and 22 may operate according to the AFSK standard, in particular to a standard compatible to Bell 202. Modems 21 and 22 may, for example, use a 1200 Hz tone for mark (typically a binary one) and a 2200 Hz tone for space (typically a binary zero). In such configuration, the data transfer rate between a single topside low frequency modem 21 and a single subsea low frequency modem 22 may lie in a range between 1000 and 5000 Baud (e.g., at 1200 Baud and half duplex). As the data communication for all low frequency modems 22 runs over the same topside communication connection 14, the data transmission rate decreases for an increased number of installed subsea low frequency modems 22. By coupling, for example, ten low frequency modems 22 to the data transmission line 14 for controlling a corresponding number of WCM or MCM, each of these units may only communicate with the topside control center at a data throughput of 120 Baud. This is a rather low data transfer rate that may result in an increased amount of time required for uploading data or for receiving control commands at the subsea installation 12.

When installing new units, such as WCM and MCM units, it may be desirable to increase the bandwidth of the data transfer. In the embodiment of FIG. 1, a subsea communication system 10 is thus provided that comprises at the topside control center 11, a topside high frequency modem 31, and a subsea high frequency modem 32 at the subsea installation 12. The subsea communication system 10 provides a new communication path that is independent of the existing communication path of the low frequency modems 21 and 22. The subsea communication system 10 thus enables the coexistence of already existing communication structures (implemented by low frequency modems 21 and 22) and new communication structures (implemented by high frequency modems 31 and 32).

In the implementation illustrated in FIG. 1, the subsea communication system 10 comprises a subsea power distribution module 50. The subsea power distribution module 50 is connected to a topside power supply 51 comprised in the topside installation 11 by a topside power supply connection 15, which may be implemented by a power supply cable in the umbilical 13. The communication connection 14 and the power supply connection 15 may, for example, be implemented by different cables of the same umbilical 13. A first communication connection 61 may be provided between the subsea signal distribution module 40 and the subsea power distribution module 50. Subsea power distribution module 50 may further have a second communication connection 62 to the subsea module 30 comprising the subsea high frequency modem 32. This way, a new data transmission path via the first communication connection 61, the subsea power distribution module 50, and the second communication connection 62 is established, using which the modem of the subsea module 30 may communicate with the topside high frequency modem 31.

Although not illustrated in FIG. 1, it should be clear that two or more subsea modules 30, each comprising a subsea high frequency modem 32, may be connected to the subsea power distribution module 50. Each of such subsea modules 30 may have a second communication connection 62 by which the module 30 is coupled to the subsea power distribution module 50. Subsea power distribution module 50 may then be adapted to distribute data communications between the different subsea modules 30 connected thereto. This is explained in more detail further below with respect to FIG. 3.

One function of subsea power distribution module 50 is the distribution of electric power to the subsea modules 20 and 30 of the subsea installation 12. Subsea power distribution module 50 may be connected to a topside power supply 51 in topside installation 11 via the power supply connection 15. Subsea power distribution module 50 may comprise a transformer for transforming a voltage at which the electric power is supplied from the topside installation to a voltage required by the subsea modules 20, 30 for operation. A single transformer may supply plural subsea modules 20, 30 with electric power, or a transformer may be provided for each of the subsea modules 20, 30.

In a particular example, each of the subsea modules 20, 30 is fed with electric power from a secondary side of a transformer comprised in subsea power distribution module 50. The voltage delivered from the topside power supply 51 may be an AC voltage of 100 to several hundred volts (e.g., 110 V AC). The subsea modules may operate with a voltage in a range of 10 to 100 V AC (e.g., at 24 V AC). The primary side of the transformers for each subsea module 20, 30 may be connected together in the subsea power distribution module 50 and the power supply connection 15 may be terminated in this joint connection.

Each of the subsea modules 20, 30 may be connected to the subsea power distribution module 50 via a power supply connection 63. Each of the subsea modules 20, 30 may be operated on the electric power supplied on the connection 63. The connections may be implemented by subsea cables running from the power distribution module 50 to each of the subsea modules 20, 30. If a new subsea module 30 is installed that comprises a high frequency modem 32, it is possible to connect the new module 30 to the subsea power distribution module 50 via a cable that implements both the communication connection 62 and the power supply connection 63 (e.g., via different physical lines running in the cable). The number of cable connections to the newly installed subsea module 30 may thus be reduced as no separate connection to the subsea signal distribution module 40 may be required. In other implementations, two separate cables may be run between subsea power distribution module 50 and subsea module 30.

The first communication connection 61 between the subsea signal distribution module 40 and the subsea power distribution module 50 may similarly be realized by a cable connection using a subsea cable. If the two modules 40 and 50 are integrated within a common housing (e.g., a pressure resistant or a pressure compensated canister), conventional cable connections may be used.

In the embodiment of FIG. 1, both the low frequency modems 21 and 22 and the high frequency modems 31 and 32 communicate over the same topside communication connection 14, which may be realized as a single physical line (e.g., a copper line), running in umbilical 13. For enabling the transmission of the communication signals of both types of modems over the same communication line, the topside installation 11 and the subsea signal distribution module 40 may both comprise a frequency multiplexer 41, such as a frequency diplexer. The high frequency modems 31 and 32 communicate in a frequency band that is higher than the frequencies used by low frequency modems 21 and 22 for communication. At each end of the topside communication connection 14, the diplexer may add the signals received from both types of modems for transmission on the common communication connection 14, or separate the signals received on the common communication connection 14 in accordance with their frequency and forwards them to the respective modem.

Such frequency multiplexer 41 may be realized by high and low frequency filters, or band pass filters. A possible implementation of a diplexer that may be used in the topside installation 11 and the subsea signal distribution module 40 of FIG. 1 is illustrated in FIG. 2.

Figure 2:
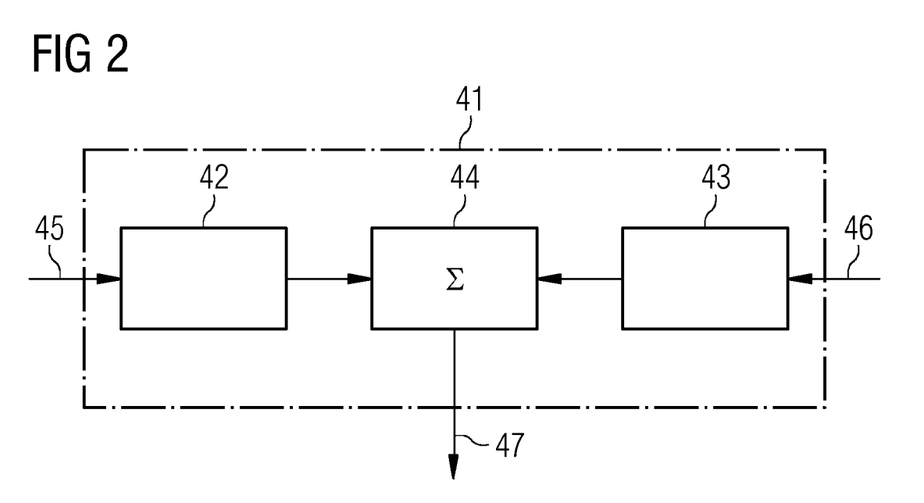
FIG. 2 is a schematic block diagram illustrating an example configuration of a frequency multiplexer that may be used in embodiments of the subsea communication system.

The diplexer 41 of FIG. 2 may be used as both a topside diplexer in the topside installation 11 and a subsea diplexer in subsea signal distribution module 40. The diplexer 41 may comprise a first interface 45 towards the respective low frequency modem (21 or 22) and a second interface 46 towards the respective high frequency modem (31 or 32). Between the subsea diplexer and the respective modem, for example, a component may be coupled that distributes a received signal to further modems of the same type. The diplexer may comprise a third interface 47 towards the topside communication connection 14. Between interfaces 45 and 47, a low pass or band pass filter 42 is coupled that passes frequencies of the frequency range using which the low frequency modems 21 and 22 communicate. In the configuration of the low frequency modems described further above, low pass or band pass filter 42 may, for example, pass the 1200 and 2200 Hz signals.

Between the interfaces 46 and 47, the high pass or band pass filter 43 is coupled that is adapted to pass frequencies of the frequency range used by high frequency modems 31 and 32 for communication. High pass or band pass filter 43 may, for example, be adapted to pass a frequency band lying in a frequency range of about 50 kHz to about 10 MHz, such as the frequency band of the OFDM communication scheme.

Component 44 (adder/splitter) combines the signals received from the filters 42, 43 or splits the signal received from the topside communication connection 14. The arrows shown in FIG. 2 illustrate a situation in which data communication signals are received from the high frequency and low frequency modems, so that component 44 acts as a combiner/adder. Component 44 sums the signals and supplies the signals to topside communication connection 14 via interface 47. In an embodiment in which a data communication signal is received from the topside communication connection 14, the arrows can be reversed. In the simplest configuration, component 44 may simply be a branching point that connects the topside communication connection 14 with both filters 42 and 43.

It should be clear that other configurations of the topside and subsea diplexers 41 are conceivable. In particular, any diplexer known in the art may be used.

In operation, data communication signals that are simultaneously received from the high frequency modem 31/32 and the low frequency modem 21/22 are multiplexed by the diplexer 41 onto the topside communication connection 14, with the diplexer on the other side of the topside communication connection 14 demultiplexing the combined signal and supplying the demultiplexed data communication signals to the respective high frequency or low frequency modem. In certain embodiments, as the data communication signals of the different types of modems are transmitted in different frequency ranges, they do not interfere and do not degrade the communication. Accordingly, with an existing umbilical and without the need to replace the topside and subsea low frequency modems 21 and 22, a high speed data transmission may be established between the topside installation 11 and the subsea installation 12.

Topside and subsea diplexers 41 enable the simultaneous transmission of the communication signals of both types of modems over the single topside communication connection 14. Although in the embodiments disclosed herein, the topside and subsea diplexers have a similar configuration, it should be clear that they may have different configurations in other embodiments. The diplexers 41 may be implemented as passive analog devices. This means that they do not perform separate splitting and combination steps, but are coupled between the respective two modems and the topside communication connection 14 and perform an analog splitting and combination of data communication signals of the different frequency ranges. In other embodiments, a digital adding/splitting of the data communication signals may be performed.

Figure 3:
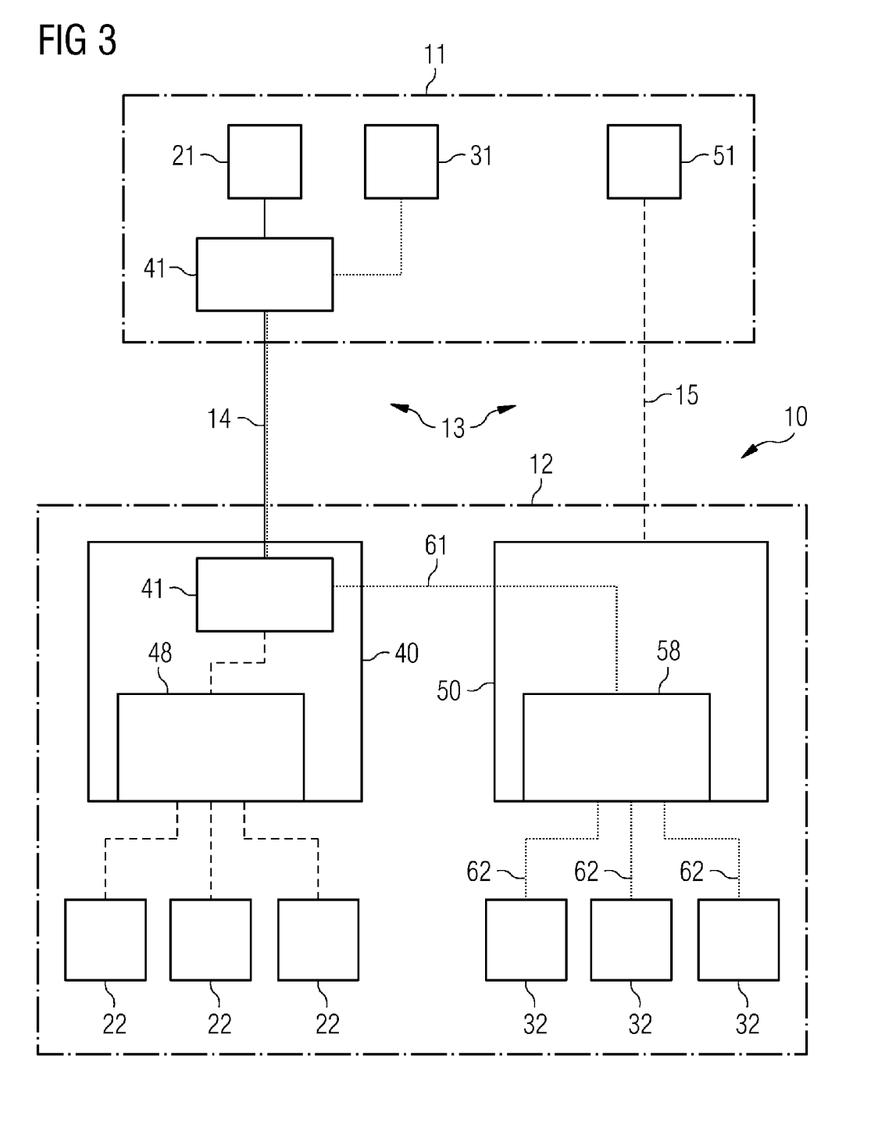
FIG. 3 is a schematic block diagram illustrating an embodiment of a subsea data communication system in which the distribution of data communications to subsea modules having subsea modems of the first type and to subsea modules having subsea modems of the second type is shown.

FIG. 3 illustrates the subsea communication system 10 of FIG. 1 in a slightly different configuration, in which plural subsea modules comprising high frequency subsea modems 32 are coupled to the subsea power distribution module 50. The subsea low frequency modems 22 and the subsea high frequency modems 32 are each comprised in a subsea module, similar to the subsea modules 20 and 30 of FIG. 1. For the purpose of a comprehensive presentation, the subsea modules and power supply connections between the subsea power distribution module 50 and the subsea modules are not explicitly shown in FIG. 3. The explanations given above with respect to FIGS. 1 and 2 also apply to the subsea communication system 10 illustrated in FIG. 3.

In FIG. 3, the distribution of data communications received from the topside high and low frequency modems 31, 21 at the subsea installation 12 is illustrated in more detail. The subsea signal distribution module 40 comprises a low frequency distribution unit 48 that distributes data communications received from low frequency topside modem 41 to the subsea low frequency modems 22 (and vice versa forwards data communications received from the low frequency modems 22 to diplexer 41). In certain embodiments, the low frequency distribution unit 48 may be implemented as a branching point that connects the communication lines to the different subsea low frequency modems 22. In particular, this may be possible where the low frequency modems communicate using a multi drop communication scheme. Other configurations are also conceivable, in which the low frequency distribution unit 48 is, for example, implemented as a hub, a switch, an access multiplier, or the like.

Data communications forwarded by the subsea diplexer 41 comprised in subsea signal distribution module 40 to the subsea power distribution module 50 are distributed among the different subsea high frequency modems 32 by means of high frequency distribution unit 58. High frequency distribution unit 58 comprises a number of interfaces towards subsea high frequency modems 32, towards which the high frequency distribution unit 58 connects via respective second communication connections 62. In the embodiment illustrated in FIG. 3, the high frequency distribution unit 58 is adapted to enable a point to point connection between the topside high frequency modem 31 and each of the subsea high frequency modems 32. High frequency distribution unit 58 may, for example, be implemented as an access multiplier. With the use of respective communication schemes, other implementations of the high frequency distribution unit 58 are also conceivable, such as an implementation as a hub, a switch, or the like. It is also possible to provide several high frequency topside modems 31 by using a corresponding high frequency distribution unit at the topside installation 11. High frequency distribution unit 58 may itself act as a modem on each of its interfaces, thereby enabling an almost simultaneous communication of the different subsea high frequency modems 32 with one or more topside high frequency modems 31 on the single communication connections 61 and 14.

As can be seen, the embodiments of the subsea communication system 10 may provide an additional communication path that enables the integration of upgraded subsea modules into the communication system without affecting the existing communication structure, i.e., the communication of the low frequency modems with existing subsea modules. In particular, in certain embodiments, it is possible to continue using the same communication and power cables with the high frequency and the low frequency communication systems being unaware of each other. The subsea modules, such as MCMs and WCMs, may be upgraded and replaced without affecting the operation of the other units. A stepwise upgrading thus becomes possible, with the two communication systems coexisting until the upgrading of the last subsea module.

The above embodiments describe one possible implementation of the subsea communication system 10. The implementation of the additional communication path may also be achieved in different ways. As an example, a subsea high frequency modem may already be provided in the subsea signal distribution module 40 or the subsea power distribution module 50. Such subsea high frequency modem may communicate with the corresponding topside high frequency modem using an OFDM communication scheme. It may use a network connection, such as Ethernet, to communicate via the subsea power distribution module 50 with network transceivers comprised in the subsea module(s) 30. The subsea high frequency modem may for example be connected directly to subsea diplexer 41, or may be comprised in the high frequency distribution unit 58.

Another implementation uses a power line communication (e.g., via the topside power supply connection 15 and/or the power supply connections 62). A power line modem may be comprised in the topside installation 11 and another power line modem may be comprised in the subsea power distribution module 50, both modems communicating via the power supply connection 15. Further distribution of the signals may again be performed by a network connection between the power distribution module 50 and the subsea modules 30. On the other hand, a power line communication may be performed directly between a power line modem comprised in topside installation 11 and subsea power line modems comprised in each of the subsea modules 30. As can be seen, there are several possibilities of providing an additional communication path via the subsea power distribution module 50. Features of the above embodiments may be combined. The communication may, for example, occur as outlined above via the signal distribution module 40 and the first communication connection 61 with a high frequency modem in subsea power distribution module 50, and from there on via power line communication with power line modems being located in the subsea modules 30.

Figure 4:
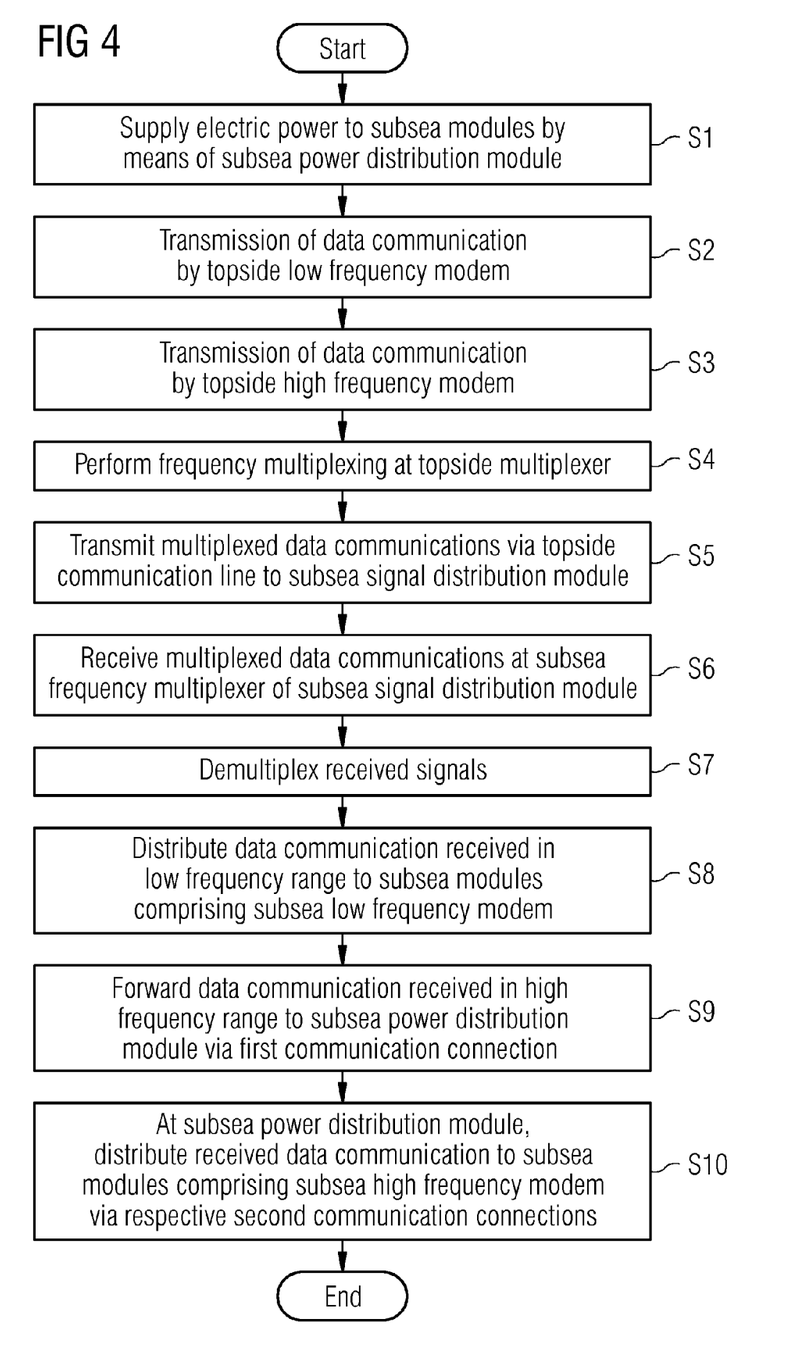
FIG. 4 is a flow diagram illustrating a method according to an embodiment.

FIG. 4 illustrates a flow diagram of an embodiment of a method. In act 51, electric power is supplied to the subsea modules by the subsea power distribution module 50. Act S1 may be performed continuously during operation of the subsea communication system 10. In act S2, a data communication of the topside low frequency modem 21 is transmitted. In act S3, which may be performed simultaneously with act S2, a data communication is transmitted by the topside high frequency modem 31. At the topside multiplexer (e.g. diplexer 41), a frequency multiplexing is performed in act S4. Both data communications are thus multiplexed onto the single topside communication connection 14.

In act S5, the multiplexed data communications are transmitted via the topside communication connection 14 to the subsea signal distribution module 40. The received signals are demultiplexed in act S7 (e.g., by subsea diplexer 41). The data communication received in the low frequency range is then distributed to the subsea modules 20 that each comprise a subsea low frequency modem 22 (act S8). The data communication received in the high frequency range is forwarded to the subsea power distribution module 50 via the first communication connection 61 (act S9). In act S10, the data communication received at the subsea power distribution module 50 is distributed to the subsea modules 30 comprising the subsea high frequency modems 32 via respective second communication connections 62.

It should be clear that, in certain embodiments, the method may be performed continuously and may also comprise the reverse process, i.e., the aggregation of several data communications of the subsea high and low frequency modems and their transmission via topside communication connection 14 to the topside installation 11.

The method may be performed by any of the subsea communication systems 10 illustrated and explained above with respect to FIGS. 1, 2, and 3.

Embodiments provide a cost effective and flexible method of upgrading the communication system of a subsea installation, so as to enable a communication with a high data transmission bandwidth between a topside installation and subsea modules of a subsea installation. The subsea installation may be upgraded stepwise without affecting the existing communication infrastructure.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A subsea communication system comprising:
   a subsea power distributor configured to be connected to a topside power supply of a topside installation and to distribute electric power received from the topside power supply to a plurality of subsea modules comprising a first subsea module having a subsea modem of a first type and a second subsea module having a subsea modem of a second type;
   a subsea signal distributor, separate from the subsea power distributor, the subsea signal distributor providing a topside communication connection to the topside installation, wherein the subsea signal distributor is connected with the second subsea module, wherein the subsea signal distributor is configured to forward data communications received from a topside modem of a first type to the subsea modem of the first type via the subsea power distributor and to distribute data communications received from a topside modem of a second type to the subsea modem of the second type;
   a first communication connection between the subsea signal distributor and the subsea power distributor, the first communication connection configured to provide a data communication between the subsea power distributor and the topside installation via the subsea signal distributor; and
   a second communication connection between the subsea power distributor and the first subsea module, wherein the subsea power distributor is configured to forward data communications received on the first communication connection to the first subsea module via the second communication connection.

2. The subsea communication system according to claim 1, wherein the subsea power distributor and the first subsea module are connected by a cable, the cable providing the second communication connection and further providing a power supply connection between the subsea power distributor and the first subsea module.

3. The subsea communication system according to claim 1, further comprising at least one additional communication connection and at least one additional subsea module, wherein the at least one additional communication connection connects the subsea power distributor to the at least one additional subsea module, wherein the subsea power distributor is configured to distribute data communications received on the first communication connection to the at least one additional subsea module via the respective additional communication connection.

4. The subsea communication system according to claim 3, wherein the subsea power distributor comprises a switch, an access multiplier, or a hub for distributing the data communications received on the first communication connection.

5. The subsea communication system according to claim 1, wherein the subsea communication system is configured to enable the subsea modem of the first type to perform a data communication with the topside modem of the first type at the topside installation via the subsea power distributor and the first and second communication connections.

6. The subsea communication system according to claim 1, wherein the topside modem of the first type and the subsea modem of the first type are configured to perform a data communication at a higher data transfer rate than the topside modem of the second type and the subsea modem of the second type.

7. The subsea communication system according to claim 5, wherein the subsea modem of the first type is configured to perform the data communication with the topside modem of the first type using an orthogonal frequency-division multiplexing (OFDM) scheme.

8. The subsea communication system according to claim 1, wherein the subsea modem of the first type and topside modem of the first type are communicating in a first frequency band that is higher than a second frequency band in which the topside modem of the second type and subsea modem of the second type are communicating,
   wherein the subsea signal distributor comprises a frequency multiplexer that is configured to combine and/or split the first and second frequency bands so as to enable a data communication of the topside modem of the first type with the subsea modem of the first type in the first frequency band and of the topside modem of the second type with the subsea modem of the second type in the second frequency band on a single communication line connecting the subsea signal distributor to the topside installation.

9. The subsea communication system according to claim 2, further comprising at least one additional communication connection and at least one additional subsea module, wherein the at least one additional communication connection connects the subsea power distributor to the at least one additional subsea module, wherein the subsea power distributor is configured to distribute data communications received on the first communication connection to the at least one additional subsea module via the respective additional communication connection.

10. The subsea communication system according to claim 9, wherein the subsea power distributor comprises a switch, an access multiplier, or a hub for distributing the data communications received on the first communication connection.

11. The subsea communication system according to claim 1, wherein the subsea modem of the first type is configured to perform the data communication with the topside modem of the first type using an orthogonal frequency-division multiplexing (OFDM) scheme.

12. The subsea communication system according to claim 6, wherein the subsea modem of the first type is configured to perform the data communication with the topside modem of the first type using an orthogonal frequency-division multiplexing (OFDM) scheme.

13. A method of operating a subsea communication system, the subsea communication system comprising: (1) a subsea power distributor configured to be connected to a topside power supply of a topside installation and to distribute electric power received from the topside power supply to a subsea module, and (2) a subsea signal distributor connected via a first communication connection to the subsea power distributor, the method comprising:
- receiving a data communication from the topside installation on the first communication connection at the subsea power distributor;
- forwarding the received data communication on a second communication connection from the subsea power distributor to the subsea module using a cable that also connects the subsea power distributor to the subsea module;
- supplying electric power from the subsea power distributor to the subsea module for operating the subsea module using the cable that also connects the subsea power distributor to the subsea module; and
- forwarding a data communication received by the subsea signal distributor from the topside installation to the subsea power distributor on the first communication connection.

14. The method according to claim 13, wherein the data communication that is forwarded on the first communication connection is received from a topside modem of a first type and forwarded to a subsea modem of a first type, the method further comprising:
- at the subsea signal distributor, receiving from a topside modem of a second type a data communication and forwarding the data communication to a subsea modem of a second type arranged in an additional subsea module and connected to the subsea signal distributor,
- wherein the forwarding of a data communication to the subsea modem of the first type or the subsea modem of the second type is performed in dependence on a frequency band in which the data communication is received by the subsea signal distributor.

* * * * *